United States Patent
Humfeld et al.

(10) Patent No.: US 9,816,892 B2
(45) Date of Patent: Nov. 14, 2017

(54) SYSTEMS AND METHODS FOR FUEL LEAK DETECTION

(71) Applicant: The Boeing Company, Chicago, IL (US)

(72) Inventors: Keith D. Humfeld, Federal Way, WA (US); Morteza Safai, Newcastle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/995,429

(22) Filed: Jan. 14, 2016

(65) Prior Publication Data

US 2017/0205306 A1   Jul. 20, 2017

(51) Int. Cl.
*G01M 3/02* (2006.01)
*G01M 3/22* (2006.01)

(52) U.S. Cl.
CPC ............ *G01M 3/025* (2013.01); *G01M 3/226* (2013.01)

(58) Field of Classification Search
CPC ..... G01M 3/26; G01M 3/2876; G01M 3/2846
USPC ............... 73/40, 40.5 R, 40.7, 46, 49.1, 49.5
See application file for complete search history.

(56) References Cited

U.S. PATENT DOCUMENTS

| | | | |
|---|---|---|---|
| 5,176,025 A | 1/1993 | Butts | |
| 2007/0062411 A1 | 3/2007 | Weisman et al. | |
| 2010/0064773 A1* | 3/2010 | Meredith | G01M 3/047 73/40 |
| 2011/0204281 A1* | 8/2011 | Rouse | B82Y 30/00 252/75 |
| 2011/0269243 A1* | 11/2011 | Strano | B82Y 30/00 436/172 |

OTHER PUBLICATIONS

European Extended Search Report dated May 18, 2017, in EP Application No. 16200703.3, 8 pages.
Humayun, MD et al., "Functionalized Multi-Walled Carbon Nanotube based Sensors for Distributed Methane Leak Detection", IEEE, Nov. 1, 2015, pp. 1-4.

\* cited by examiner

*Primary Examiner* — Yara B Green
*Assistant Examiner* — Hugh H Maupin
(74) *Attorney, Agent, or Firm* — MH2 Technology Law Group LLP

(57) ABSTRACT

In one aspect, systems for detecting a fuel leak are described herein. In some implementations, a system for detecting a fuel leak described herein comprises a fuel-containing vessel having an exterior surface and a carbon nanotube coating layer comprising photoluminescent carbon nanotubes disposed on at least a portion of the exterior surface of the fuel-containing vessel. The system further comprises a fuel-sensitive coating layer substantially covering the carbon nanotube coating layer. The fuel-sensitive coating layer is optically opaque or substantially opaque to wavelengths of light absorbed and/or emitted by the photoluminescent carbon nanotubes.

20 Claims, 2 Drawing Sheets

SYSTEMS AND METHODS FOR FUEL LEAK DETECTION

FIELD

The present disclosure relates to systems and methods for detecting fuel leaks from a fuel-containing vessel and, in particular, to systems and methods for detecting leaks of jet fuel using photoluminescence.

BACKGROUND

The rapid and accurate detection of fuel leaks from fuel-containing vessels is important for a variety of applications, including energy, transportation, and aerospace applications. Unfortunately, many existing systems and methods for detecting fuel leaks suffer from one or more limitations. For example, some systems and methods may not reveal small or early-stage leaks, and instead may only detect and/or locate a leak after a relatively large amount of fuel has leaked. Additionally, some prior systems and methods for detecting fuel leaks cannot easily detect leaks in remote, confined, or otherwise hard to access spaces. Further, some previous systems and methods that rely on luminescence use fluorophores that have a limited useful lifespan and/or fail under certain operating conditions. In some cases, for instance, the fluorophores degrade into non-luminescent components or otherwise lose their luminescence upon exposure to oxygen, moisture, high temperature (such as a temperature greater than 80° C. or greater than 100° C.), or a combination thereof, thereby destroying the ability of the fluorophores to identify a leak. Prolonged exposure to fuel (such as exposure for more than 12 hours, more than 24 hours, or more than 1 week) can also cause some existing fluorophores to lose some or all of their luminescence. Additionally, some fluorescent organic molecule fluorophores are colored and/or exhibit some amount of reflectance at their fluorescence or other detection-related wavelengths. These optical properties can lead to poor imaging contrast, reduced signal-to-noise ratios (SNRs), or both.

Therefore, there exists a need for systems and methods for detecting fuel leaks that can detect an early-stage and/or small fuel leak; that permit detection of a fuel leak in remote, confined, or otherwise hard to access spaces; that have improved operability when exposed to high temperatures, fuel, oxygen, and/or moisture; and that provide improved imaging contrast and/or SNR.

SUMMARY

Systems and methods for detecting one or more fuel leaks are described herein which, in some cases, can address one or more of the limitations and/or needs identified above. For example, in some implementations, a system and/or method described herein can be used to detect an early-stage fuel leak, a small fuel leak, or a combination thereof. A system and/or method described herein, in some cases, can also detect a fuel leak in a remote, confined, or otherwise hard to access space. Additionally, in some implementations, a system and/or method described herein can detect fuel leaks even under harsh environmental conditions. For example, in some instances, a system and/or method described herein can detect a fuel leak even when a fluorophore of the system and/or method is exposed to high temperatures, oxygen, moisture, and/or fuel, including for prolonged periods of time. Moreover, a system and/or method described herein can also provide high imaging contrast and/or a high signal-to-noise ratio (SNR).

In one aspect, methods for detecting a fuel leak are described herein. In some implementations, a method of detecting a fuel leak described herein comprises disposing a carbon nanotube coating layer on an exterior surface of a fuel-containing vessel, such as a fuel storage tank or fuel line, wherein the carbon nanotube coating layer comprises photoluminescent carbon nanotubes. The method further comprises disposing a fuel-sensitive coating layer over the carbon nanotube coating layer. The fuel-sensitive coating layer can be optically opaque or substantially opaque to wavelengths of light absorbed and/or emitted by the photoluminescent carbon nanotubes of the carbon nanotube coating layer. For instance, in some cases, the fuel-sensitive coating layer is a pigmented layer.

A method described herein can further comprise exposing the exterior surface of the fuel-containing vessel to a light source for excitation of the photoluminescent carbon nanotubes. As described further hereinbelow, exposing the exterior surface of the fuel-containing vessel to such a light source can indicate whether or not a fuel leak has occurred. Specifically, when a fuel leak occurs, at least a portion of the fuel-sensitive coating layer can be dissolved, dispersed, thinned, or otherwise altered such that the fuel-sensitive coating layer becomes transparent rather than opaque, particularly with respect to light absorbed and/or emitted by the photoluminescent carbon nanotubes of the underlying carbon nanotube coating layer. In such an instance, the light source can excite the photoluminescent carbon nanotubes, the photoluminescent carbon nanotubes can then emit photoluminescence, and, importantly, the photoluminescence of the emissive carbon nanotubes can be detected by a photodetector external to the fuel-containing vessel. As described further hereinbelow, the detection of the photoluminescence of the emissive carbon nanotubes can serve as a positive signal that a fuel leak has occurred.

Thus, in some implementations, a method described herein further comprises detecting photoluminescent emission of the photoluminescent carbon nanotubes after exposing the fuel-containing vessel to a light source that excites the photoluminescent carbon nanotubes. Conversely, a method described herein may also comprise exposing the exterior surface of the fuel-containing vessel to a light source for excitation of the photoluminescent carbon nanotubes and subsequently detecting no photoluminescence from the photoluminescent carbon nanotubes of the carbon nanotube coating layer. In such an instance, the absence of detected photoluminescence can serve as a negative signal indicating that no fuel leak has occurred.

In another aspect, systems for detecting a fuel leak are described herein. In some implementations, a system described herein comprises a fuel-containing vessel having an exterior surface, and a carbon nanotube coating layer comprising photoluminescent carbon nanotubes disposed on at least a portion of the exterior surface of the fuel-containing vessel. The system also comprises a fuel-sensitive coating layer substantially covering the carbon nanotube coating layer. Moreover, the fuel-sensitive coating layer can be optically opaque or substantially opaque to wavelengths of light absorbed and/or emitted by the photoluminescent carbon nanotubes. In addition, in some cases, a system described herein further comprises a light source that excites the photoluminescent carbon nanotubes. The system may also comprise a detector that detects photoluminescent emission from the photoluminescent carbon nanotubes.

These and other implementations are described in more detail in the detailed description that follows.

DETAILED DESCRIPTION

Figure 1:
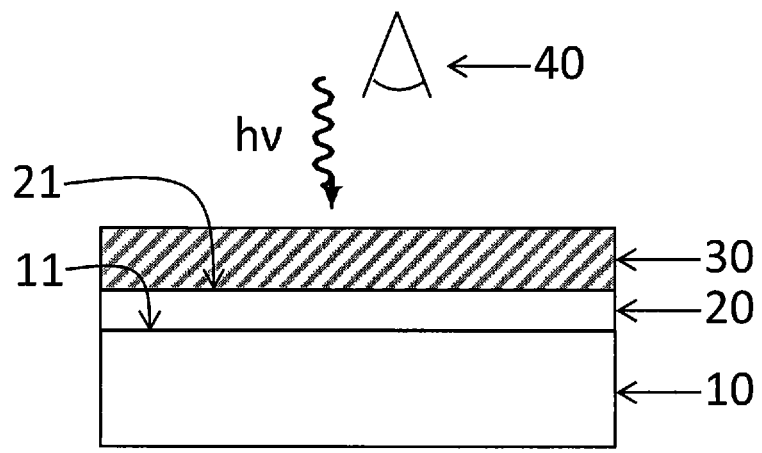
FIG. 1 illustrates a sectional view of some components of a system used to carry out a method according to one implementation described herein.

Implementations described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or a range of "from 5 to 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. Methods for Detecting a Fuel Leak

In one aspect, methods for detecting a fuel leak are described herein. In some implementations, a method for detecting a fuel leak described herein comprises disposing a carbon nanotube coating layer on an exterior surface of a fuel-containing vessel. The carbon nanotube coating layer comprises photoluminescent carbon nanotubes. The method further comprises disposing a fuel-sensitive coating layer over the carbon nanotube coating layer. The fuel-sensitive coating layer is optically opaque or substantially opaque to wavelengths of light absorbed by the photoluminescent carbon nanotubes of the carbon nanotube coating layer, wavelengths of light emitted by the photoluminescent carbon nanotubes of the carbon nanotube coating layer, or both. A method described herein can further comprise exposing the exterior surface of the fuel-containing vessel to a light source for excitation of the photoluminescent carbon nanotubes. Exposing the exterior surface of the fuel-containing vessel to such a light source can indicate whether or not a fuel leak has occurred. Specifically, when a fuel leak occurs, at least a portion of the fuel-sensitive coating layer can be dissolved, dispersed, removed, thinned, or otherwise altered such that the fuel-sensitive coating layer becomes transparent rather than opaque, particularly with respect to light absorbed by the photoluminescent carbon nanotubes of the underlying carbon nanotube coating layer, light emitted by the photoluminescent carbon nanotubes of the underlying carbon nanotube coating layer, or both. In such an instance, the light source can excite the photoluminescent carbon nanotubes, the photoluminescent carbon nanotubes can then emit photoluminescence, and the photoluminescence of the emissive carbon nanotubes can be detected by a photodetector. Thus, in some implementations, a method described herein further comprises detecting photoluminescent emission of the photoluminescent carbon nanotubes after exposing the fuel-containing vessel to a light source that excites the photoluminescent carbon nanotubes. The detected photoluminescence can thus serve as a positive signal indicating the presence of a fuel leak, particularly by identifying a region of the exterior surface of the fuel-containing vessel that has been exposed to fuel in a manner sufficient to result in the detection of photoluminescence from the photoluminescent carbon nanotubes disposed on that region. Conversely, a method described herein may comprise exposing the exterior surface of the fuel-containing vessel to a light source for excitation of the photoluminescent carbon nanotubes and subsequently detecting no photoluminescence from the photoluminescent carbon nanotubes of the carbon nanotube coating layer. In such an instance, the absence of detected photoluminescence can serve as a negative signal indicating that no fuel leak has occurred.

Figure 2:
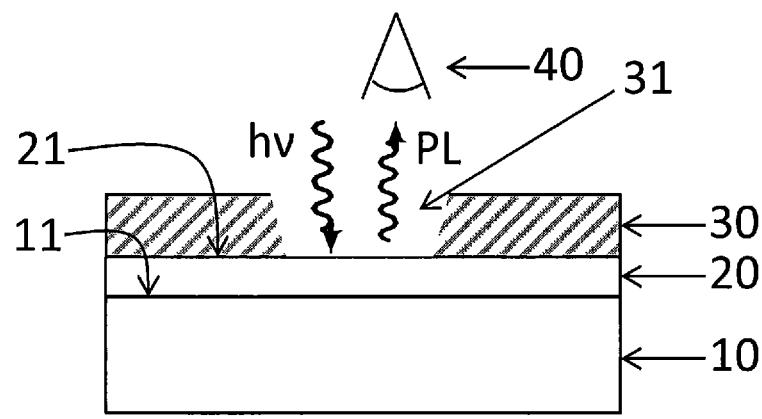
FIG. 2 illustrates a sectional view of some components of a system used to carry out a method according to one implementation described herein.

FIG. 1 and FIG. 2 schematically illustrate the foregoing detection process. With reference to FIG. 1 and FIG. 2, an exterior surface (11) of a fuel-containing vessel (10) has been coated with a carbon nanotube coating layer (20) comprising photoluminescent carbon nanotubes (not specifically shown). Additionally, a fuel-sensitive coating layer (30) has been disposed over an upper or exterior surface (21) of the carbon nanotube coating layer (20). As illustrated in FIG. 1, the fuel-sensitive coating layer (30) substantially covers the carbon nanotube coating layer (20), and there are no significant gaps in coverage of the carbon nanotube coating layer (20) by the fuel-sensitive coating layer (30). Further, as depicted in FIG. 1, a fuel leak has not occurred. Therefore, when the coated exterior surface (11) of the fuel-containing vessel (10) is exposed to or illuminated with light (hv) having a wavelength corresponding to the absorption spectrum of at least a portion of the photoluminescent carbon nanotubes, no photoluminescence from the photoluminescent carbon nanotubes exits the coating layers (20, 30) to be detected by an external detector (40). The intact fuel-sensitive coating layer (30) instead blocks (e.g., absorbs) the excitation light (hv), or any photoluminescence emitted by the photoluminescent carbon nanotubes of the carbon nanotube coating layer (20), or both the excitation light (hv) and also any photoluminescence emitted by the photoluminescent carbon nanotubes of the carbon nanotube coating layer (20).

In contrast, as depicted in FIG. 2, a fuel leak has occurred and the fuel-sensitive coating layer (30) is no longer fully intact. Instead, a portion (31) of the fuel-sensitive coating layer (30) has been dissolved, dispersed, removed, thinned, or otherwise altered as a result of its exposure to the fuel (not shown). Accordingly, when the coated exterior surface (11) of the fuel-containing vessel (10) is exposed to or illuminated with excitation light (hv), photoluminescence (PL) from the photoluminescent carbon nanotubes of the carbon nanotube coating layer (20) is detected by the detector (40).

Turning now to specific steps of methods described herein, a method described herein comprises disposing a carbon nanotube coating layer on an exterior surface of a fuel-containing vessel, wherein the carbon nanotube coating layer comprises photoluminescent carbon nanotubes. As understood by a person of ordinary skill in the art, the properties of a single-walled carbon nanotube strongly depend on its geometric structure. This structure is often characterized by identification and enumeration of chiral indices (n,m). The indices n and m denote the number of unit vectors along two directions in the honeycomb crystal lattice of graphene. These indices can be used to determine important parameters of a nanotube, such as whether the nanotube is metallic (n=m), semimetallic (n−m is a multiple of 3), or semiconducting (other values of n−m). Nanotubes having a value of m=0 are generally referred to as zigzag nanotubes, and nanotubes having values of n=m are generally referred to as armchair nanotubes. Nanotubes having values of n, m, or both differing from zigzag and armchair nanotubes are generally referred to as being chiral nanotubes. In general, semiconducting single-walled carbon nanotubes are photoluminescent. Moreover, as understood by a person of ordinary skill in the art, photoluminescent carbon nanotubes are capable of absorbing certain wavelengths of light, and then emitting certain other wavelengths of light.

Thus, in some implementations described herein, the photoluminescent carbon nanotubes of the carbon nanotube coating layer are semiconducting carbon nanotubes. However, any photoluminescent carbon nanotubes may be used in a carbon nanotube coating layer described herein. Moreover, in some cases, a carbon nanotube coating layer comprises a mixture of differing photoluminescent carbon nanotubes having differing (n,m) values. For example, in some instances, the photoluminescent carbon nanotubes have one or more (n,m) values selected from the group consisting of (10,3), (9,4), (8,6), (12,1), (11,3), (8,7), (10,5), (9,7), (13,2), (12,4), (11,4), (10,6), (9,8), (11,6), (14,1), (13,3), (12,5), (11,7), (10,8), (15,1), (14,3), (13,5), (10,9), (12,7), (16,2), (15,4), (15,2), (14,4), (13,6), (12,8), (11,9), (14,6), (17,1), (16,3), (15,5), (14,7), (11,10), (13,8), and (13,9). However, it is to be understood that any mixture of carbon nanotube chiralities may be used, provided that the carbon nanotube coating layer comprises photoluminescent carbon nanotubes. In addition, it is not necessary for the carbon nanotubes of the carbon nanotube coating layer to be enriched in any particular carbon nanotube isomer, or even in photoluminescent carbon nanotubes more generally. Instead, the carbon nanotubes of a carbon nanotube coating layer described herein can comprise a mixture of photoluminescent and non-photoluminescent carbon nanotubes, metallic and semimetallic carbon nanotubes, or a combination thereof. Various commercial sources of carbon nanotubes can thus be used to form a carbon nanotube coating layer described herein, including unpurified commercial sources including a variety of types of single-walled carbon nanotubes. However, if desired, the carbon nanotubes of a carbon nanotube coating layer may be enriched in certain chiralities. In particular, in some implementations, the carbon nanotubes are enriched in photoluminescent carbon nanotubes, including photoluminescent carbon nanotubes having one or more of the specific (n,m) values recited above. More generally, in some cases, photoluminescent carbon nanotubes form up to 100%, up to 90%, up to 80%, up to 75%, up to 70%, up to 60%, up to 50%, up to 40%, up to 30%, up to 20%, or up to 10% of the carbon nanotubes of the carbon nanotube coating layer, based on the total number or total weight of the carbon nanotubes of the carbon nanotube coating layer.

It is further to be understood that carbon nanotubes of the carbon nanotube coating layer can have any size not inconsistent with the objectives of the present disclosure. For example, in some cases, the carbon nanotubes have an average diameter of 0.7 to 1.5 nanometers (nm) or 1 to 4 nm, and an average length of 10 nm to 1000 microns (μm) or 10 nm to 10 μm.

As described above, a carbon nanotube coating layer described herein is disposed on an exterior surface of a fuel-containing vessel. The fuel-containing vessel can generally comprise any vessel or container that is filled with or that is operable to be filled with fuel. For example, in some cases, the fuel-containing vessel comprises a fuel-storage vessel such as a tank or cylinder. A fuel-containing vessel may also be a fuel-transport vessel such as a pipe or fuel line. Moreover, the size and shape of a fuel-containing vessel described herein is not particularly limited. Instead, the vessel can have any size, shape, or combination thereof not inconsistent with the objectives of the present disclosure. Similarly, a fuel-containing vessel described herein may also be formed or fabricated from any material not inconsistent with the objectives of the present disclosure. In some implementations, for example, a fuel-containing vessel described herein may comprise or be formed from metal, fiberglass, a composite material, or a combination thereof.

Further, an exterior surface of a fuel-containing vessel may have any size and shape not inconsistent with the objectives of the present disclosure. In some cases, for instance, an exterior surface is planar or substantially planar. In other implementations, an exterior surface is curved or has a complex topography. For example, an exterior surface can be concave or convex. Other shapes are also possible.

Additionally, the fuel contained within a fuel-containing vessel described herein may be stationary or moving within the vessel. Further, any fuel not inconsistent with the objectives of the present disclosure may be used. In some implementations, for instance, the fuel comprises jet fuel, biofuel, kerosene, compressed natural gas, a fossil fuel such as gasoline or diesel, or a combination thereof. A jet fuel, in some cases, comprises a kerosene type jet fuel such as Jet-A or Jet-A1, a naphtha type jet fuel such as Jet-B, or a military jet fuel such as JP-8 or JP-10. It is further to be understood that a fuel contained within a vessel described herein can be a liquid or a gas.

A carbon nanotube coating layer described herein can be disposed or placed on an exterior surface of a fuel-containing vessel described herein in any manner not inconsistent with the objectives of the present disclosure. For example, in some cases, the carbon nanotube coating layer is sprayed, rolled, or painted onto the exterior surface of the vessel. Moreover, a carbon nanotube coating layer can be disposed on an exterior surface of a fuel-containing vessel using either a "wet" or a "dry" technique. For instance, in some implementations, disposing the carbon nanotube coating layer on the exterior surface comprises first dispersing, dissolving, or suspending carbon nanotubes in a solvent to provide a mixture, and then spraying, rolling, or painting the mixture onto the exterior surface. Any solvent not inconsistent with the objectives of the present disclosure may be used. For example, organic solvents such as alkanes, halogenated alkanes, ethers, esters, and alcohols may be used. In some cases, a solvent comprises ethanol, hexane, or methylene chloride. Additionally, the carbon nanotubes can be dispersed, dissolved, or suspended in the solvent in any amount not inconsistent with the objectives of the present disclosure. For instance, in some cases, carbon nanotubes are present in the mixture in an amount of about 0.01 to 1 weight percent, 0.05 to 0.5 weight percent, or 0.1 to 0.2 weight percent, based on the total weight of the mixture. Following placement of a carbon nanotube-solvent mixture on the exterior surface, the solvent can be evaporated or allowed to evaporate, thereby leaving behind a layer of "neat" carbon nanotubes. As understood by one of ordinary skill in the art, a layer of "neat" carbon nanotubes can consist or consist essentially of carbon nanotubes, as opposed to also including an additional material. Thus, in some implementations, a carbon nanotube coating layer described herein comprises, consists of, or consists essentially of carbon nanotubes.

Alternatively, in other cases, a carbon nanotube coating layer described herein comprises one or more materials in addition to carbon nanotubes. For example, in some instances, a carbon nanotube coating layer is formed by dispersing, dissolving, or suspending carbon nanotubes in a matrix material, including a non-volatile matrix material, such as a polymeric matrix material. Therefore, in some implementations, disposing a carbon nanotube coating layer on an exterior surface of a fuel-containing vessel comprises dispersing, dissolving, or suspending carbon nanotubes in a matrix material to provide a composite mixture, and subsequently spraying, rolling, painting, or otherwise disposing the composite mixture on the exterior surface of the vessel.

Any matrix material not inconsistent with the objectives of the present disclosure may be used. In some cases, the matrix material comprises a polymeric or oligomeric material, with or without an additional solvent such as an organic solvent or water. Additionally, the matrix material may be organic or inorganic. Examples of suitable matrix materials include but are not limited to organic polymeric materials such as epoxy, vinyl, and phenolic polymers, and inorganic materials such as silicon oxide, titanium oxide, plaster, gunite, and galvanite.

Moreover, it is further to be understood that a matrix material, in some such implementations, is fuel-insensitive. A "fuel-insensitive" matrix material, for reference purposes herein, can remain intact or substantially intact when exposed to fuel during a fuel leak, as opposed to being dissolved or degraded by the fuel such that the carbon nanotube coating layer separates from or is otherwise lost from the exterior surface of the fuel-containing vessel.

Additionally, the carbon nanotubes can be dispersed, dissolved, or suspended in the matrix material in any amount not inconsistent with the objectives of the present disclosure. For instance, in some cases, carbon nanotubes are present in the composite mixture in an amount of about 0.01 to 1 weight percent, 0.05 to 0.5 weight percent, or 0.1 to 0.2 weight percent, based on the total weight of the composite mixture.

A carbon nanotube coating layer described herein can be present on or be disposed over any amount of an exterior surface of a fuel-containing vessel not inconsistent with the objectives of the present disclosure. In some cases, for instance, the carbon nanotube coating layer covers at least 50%, at least 70%, at least 80%, at least 90%, or at least 95% of the exterior surface, based on the total surface area of the exterior surface, or based on the total surface area of the exterior of the fuel-containing vessel. In some instances, the carbon nanotube coating layer covers 30-100%, 30-99%, 30-90%, 50-100%, 50-99%, 50-95%, 50-90%, 60-100%, 60-99%, 70-100%, 70-99%, 70-95%, 80-100%, 80-99%, 80-95%, 90-100%, 90-99%, 95-100%, or 95-99% of the exterior surface. Further, in some cases, the carbon nanotube coating layer is disposed on or over seams, joints, and/or other portions of the fuel-containing vessel that may be more likely than other portions of the vessel to fail or suffer a fuel leak. In some such cases, the carbon nanotube coating layer is disposed on or over only such portions of the fuel-containing vessel.

Moreover, in some implementations, a carbon nanotube coating layer described herein has an average thickness of up to about 10 nm, up to about 20 nm, up to about 50 nm, up to about 100 nm, up to about 200 nm, or up to about 500 nm. In some cases, a carbon nanotube coating layer described herein has an average thickness of about 10-500 nm, 10-300 nm, 10-200 nm, 10-100 nm, 20-500 nm, 20-200 nm, 50-500 nm, 50-300 nm, 50-200 nm, or 50-100 nm. Other thicknesses are also possible. Further, in some cases, the thickness of a carbon nanotube coating layer is selected based on one or more of the areal density of photoluminescent carbon nanotubes in the carbon nanotube coating layer; a desired photoluminescence signal strength to be obtained from the carbon nanotube coating layer; and the relative amount of photoluminescent carbon nanotubes in the carbon nanotube coating layer. For example, in some implementations, a carbon nanotube coating layer may consist essentially of photoluminescent carbon nanotubes. In such instances, a relatively thin carbon nanotube coating layer may be used, such as a layer having an average thickness of up to 10 nm or an average thickness of 1 to 10 nm. In other cases, the carbon nanotube coating layer may comprise carbon nanotubes dispersed within a matrix material, and the average thickness of the carbon nanotube coating layer may be relatively thick, such as up to 200 nm or 50-200 nm. Additionally, the average thickness of a carbon nanotube coating layer described herein may also be selected to avoid delamination of the layer from the exterior surface of the fuel-containing vessel.

In general, carbon nanotubes of a carbon nanotube coating layer described herein can be present on the exterior surface of a fuel-containing vessel in any areal density not inconsistent with the objectives of the present disclosure. In some cases, for example, the carbon nanotube coating layer comprises 100 carbon nanotubes per square centimeter ($cm^2$) to $1\times10^8$ carbon nanotubes per $cm^2$, 100 carbon nanotubes per $cm^2$ to $1\times10^7$ carbon nanotubes per $cm^2$, 1000 carbon nanotubes per $cm^2$ to $1\times10^6$ carbon nanotubes per $cm^2$, $1\times10^6$ carbon nanotubes per $cm^2$ to $1\times10^8$ carbon nanotubes per $cm^2$, or 10,000 carbon nanotubes per $cm^2$ to $1\times10^8$ carbon nanotubes per $cm^2$, based on the total area an upper or exterior surface of carbon nanotube coating layer (e.g., the surface that is farther away from the exterior surface of the fuel-containing vessel, and closer to the fuel-sensitive coating layer).

Methods described herein also comprise disposing a fuel-sensitive coating layer over a carbon nanotube coating layer described herein. As described above, a fuel-sensitive coating layer can be a coating layer that is at least partially dissolved, dispersed, and/or degraded by contact with fuel of the fuel-containing vessel, and/or a coating layer that is otherwise chemically or physically altered to become sufficiently optically transparent to wavelengths of light corresponding to the excitation and/or emission spectra of the photoluminescent carbon nanotubes of the carbon nanotube coating layer. Additionally, in some instances, a fuel-sensitive coating layer described herein is not sensitive to one or more environmental factors other than fuel of the fuel-containing vessel. For instance, in some implementations, the fuel-sensitive coating layer does not dissolve, disperse, degrade, or otherwise become optically transparent in a manner described herein due to contact with oxygen, moisture, operating temperatures below the melting point of the fuel-sensitive coating layer, or a combination thereof.

A fuel-sensitive coating layer described herein may comprise, consist of, consist essentially of, or be formed from any material not inconsistent with the objectives of the present disclosure. In some cases, a fuel-sensitive coating layer described herein comprises, consists of, consists essentially of, or is formed from a polymeric material, such as an organic polymeric material. In some implementations, a fuel-sensitive coating layer comprises or is formed from a polyurethane. In general, the material or materials used to form the fuel-sensitive coating layer may be selected based on one or more of the type of fuel contained by the fuel-containing vessel; the mechanical properties of the material or materials; and the optical properties of the material or materials. In some cases, for instance, the fuel-sensitive coating layer is formed from a polyurethane when the fuel-containing vessel contains jet fuel.

Additionally, in some cases, the fuel-sensitive coating layer may further comprise a dye or pigment dispersed throughout the fuel-sensitive coating layer. The use of such a dye or pigment, in some instances, can provide a desired optical opacity to the fuel-sensitive coating layer, such that the fuel-sensitive coating layer, when present at a sufficient thickness, is optically opaque to wavelengths of light absorbed, emitted, or absorbed and emitted by the photoluminescent carbon nanotubes of the underlying carbon nanotube coating layer. One non-limiting example of a pigment or dye suitable for use in a fuel-sensitive coating layer described herein is carbon black. Other dyes or pigments may also be used. Use of a pigment or dye such as carbon black may be especially useful in implementations in which the primary material used to form the fuel-sensitive coating layer (e.g., a polyurethane) is optically transparent to wavelengths of light absorbed by the photoluminescent carbon nanotubes, emitted by the photoluminescent carbon nanotubes, or absorbed and emitted by the photoluminescent carbon nanotubes of the underlying carbon nanotube coating layer. In general, the fuel-sensitive coating layer may be optically opaque or substantially optically opaque to wavelengths of light absorbed, emitted, or absorbed and emitted by the photoluminescent carbon nanotubes. A "substantially" opaque layer, for reference purposes herein, may block or absorb at least 75%, at least 80%, at least 85%, at least 90%, at least 95%, or at least 99% of incident light having wavelengths corresponding to the excitation wavelengths of the photoluminescent carbon nanotubes and/or to the emission wavelengths of the photoluminescent carbon nanotubes of the carbon nanotube coating layer. For example, in some instances, a fuel-sensitive coating layer described herein can block or absorb 75-100%, 80-100%, 85-100%, 90-100%, 95-100%, or 99-100% of incident light having wavelengths corresponding to the excitation wavelengths of the photoluminescent carbon nanotubes, the emission wavelengths of the photoluminescent carbon nanotubes of the carbon nanotube coating layer, or both. As understood by one of ordinary skill in the art, the opacity of a layer can be measured or determined in any manner not inconsistent with the objectives of the present disclosure. For instance, the opacity of a layer can be determined spectroscopically, such as by using a spectrophotometer.

Moreover, a fuel-sensitive coating layer described herein can have any thickness not inconsistent with the objectives of the present disclosure. For example, in some implementations, a fuel-sensitive coating layer has an average thickness of between 10 and 1000 µm, between 50 and 1000 µm, between 10 and 500 µm, or between 50 and 500 µm. Other thicknesses are also possible. Additionally, the thickness of a fuel-sensitive coating layer described herein, in some cases, can be selected based on one or more of the optical absorption profile of the material or materials used to form the fuel-sensitive coating layer; the desired optical opacity of the fuel-sensitive coating layer; and the degree of sensitivity of the fuel-sensitive coating layer to the fuel contained in the fuel-containing vessel. For instance, in some cases, the thickness of the fuel-sensitive coating layer is selected to have an opacity described hereinabove while also being sensitive enough to the fuel to permit detection of a small and/or early stage fuel leak in a manner described herein.

Further, a fuel-sensitive coating layer described herein can cover any portion of the carbon nanotube coating layer not inconsistent with the objectives of the present disclosure. In some implementations, the fuel-sensitive coating layer covers at least 80%, at least 85%, at least 95%, or at least 99% of the carbon nanotube coating layer, the percentage being based on the total surface area of an upper or exterior surface of the carbon nanotube coating layer. In some instances, the fuel-sensitive coating layer covers 80-100%, 80-99%, 80-90%, 85-100%, 85-99%, 85-95%, 90-100%, 90-95%, 90-99%, or 95-99% of the carbon nanotube coating layer, based on the total surface area of the upper surface of the carbon nanotube coating layer.

A fuel-sensitive coating layer described herein can be disposed or placed on or over a carbon nanotube coating layer in any manner not inconsistent with the objectives of the present disclosure. For example, in some cases, the fuel-sensitive coating layer is sprayed, painted, rolled, or cast over the carbon nanotube coating layer. The fuel-sensitive coating layer may also be disposed or deposited over the carbon nanotube coating layer by known polymer, sol-gel, or other coating deposition methods.

A method described herein, in some implementations, further comprises exposing the exterior surface of the fuel-containing vessel to a light source for excitation of the photoluminescent carbon nanotubes, and subsequently detecting the photoluminescent emission of the photoluminescent carbon nanotubes. It is to be understood that "exposing the exterior surface of the fuel-containing vessel" to a light source can include exposing the surface of the vessel itself in addition to exposing any coating layer or layers that remain disposed on the vessel's surface at the time exposure or illumination occurs. Moreover, an exterior surface of a fuel-containing vessel can be exposed to a light source in any manner not inconsistent with the objectives of the present disclosure. For example, the light source can be an external light source disposed above or remote from the exterior surface of the vessel. In addition, any light source not inconsistent with the objectives of the present disclosure may be used. For example, in some instances, the light source is a broadband light source such as a fluorescent lamp. In other implementations, the light source is a narrow band light source such as a laser. Further, in some cases, the light source is coupled to a fiber optic, borescope, or other means of light delivery. The use of such a light source, in some implementations, may permit the light source to illuminate the exterior surface of a fuel-containing vessel that is in a remote, confined, or otherwise hard to access space.

Moreover, a light source described herein can produce or emit light having wavelengths corresponding to the absorption or excitation spectrum of at least a portion of the photoluminescent carbon nanotubes, as described hereinabove. For example, in some instances, the light source produces or emits light having an average wavelength in the ultraviolet (UV) portion of the electromagnetic spectrum, such as from 100 to 400 nm, 100 to 280 nm, 280 to 315 nm, or 315 to 400 nm. In other instances, the light source produces or emits light having an average wavelength in the visible or infrared (IR) portion of the electromagnetic spectrum, such as a wavelength between 700 and 1100 nm, between 750 and 1000 nm, or between 800 and 1000 nm.

Similarly, detecting photoluminescent emission from the photoluminescent carbon nanotubes can be carried out in any manner not inconsistent with the objectives of the present disclosure. In some cases, for instance, a detector is disposed above or remote from the exterior surface of the vessel. Moreover, any detector not inconsistent with the objectives of the present disclosure may be used. For example, in some instances, a photomultiplier tube (PMT) detector can be used. In other implementations, the detector comprises a two-dimensional detector such as a charge-coupled device (CCD) image sensor or camera. Further, a detector described herein may be coupled to a fiber optic, borescope, or other means of light delivery described hereinabove. The detector may also be coupled to the light source used in the method, such that a single instrument can perform both excitation and detection functions.

Moreover, the detector can be operable to detect light of wavelengths corresponding to the emission spectrum of at least a portion of the photoluminescent carbon nanotubes of the carbon nanotube coating layer. For instance, in some cases, the detector is operable to detect light having an average wavelength in the IR or near-IR (NIR) portion of the electromagnetic spectrum. In some implementations, the detector is operable to detect light having an average wavelength of 1150 to 1850 nm or 1600 to 1800 nm.

Figure 3:
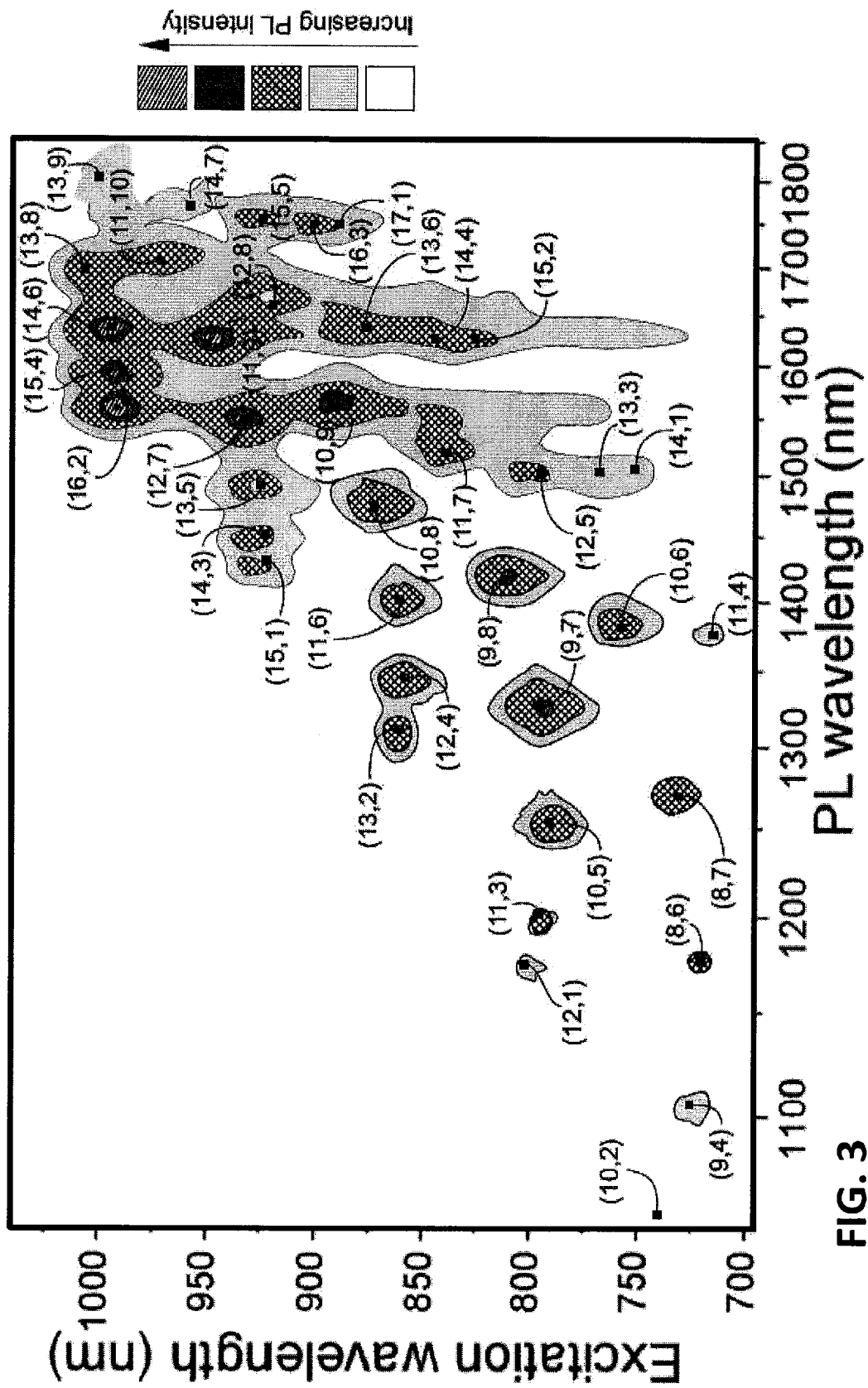
FIG. 3 illustrates a photoluminescence map of single-walled carbon nanotubes.

Additionally, in some implementations, the detector for detecting the photoluminescent emission of the photoluminescent carbon nanotubes and/or the light source for excitation of the photoluminescent carbon nanotubes is selected based on a photoluminescence map for the photoluminescent carbon nanotubes. FIG. 3 illustrates an example of one such map which may be appropriate for use in some implementations of a method described herein. Photoluminescence maps consistent with the present disclosure can be, in some implementations, prepared or created consistent with the methods discussed in Iakoubovskii et al., "IR-extended photoluminescence mapping of single-wall and double-wall carbon nanotubes," *Journal of Physical Chemistry B* 110 (2006), 17420-17424. In photoluminescence maps consistent with the foregoing, a data point is provided which corresponds to a plot of excitation wavelength for an absorption maximum of a carbon nanotube having a given chirality versus the nanotube's photoluminescence wavelength. In FIG. 3, n and m values associated with a particular photoluminescence emission frequency and an absorption maximum are indicated beneath the corresponding data point for that chirality. Thus, in some cases, the light source for excitation of the photoluminescent carbon nanotubes is selected to provide light having an average wavelength of 700 to 1100 nm, and the detector for detecting photoluminescent emission from the photoluminescent carbon nanotubes is operable to detect light having an average wavelength of 1150 to 1850 nm.

It is further to be understood that, in some implementations, the detector for detecting the photoluminescent emission of the photoluminescent carbon nanotubes, or the light source for excitation of the photoluminescent carbon nanotubes, or both, is selected to correspond to wavelengths of light typically not present in ambient conditions, or to wavelengths of light present in relatively low amounts or intensities in ambient conditions. For example, in some instances, a UV excitation source and an IR detector can be used. The use of such wavelengths can improve the signal-to-noise ratio (SNR) of a method described herein.

Methods described hereinabove are directed to detecting a fuel leak from a fuel-containing vessel. However, a method described herein can also be used, in some cases, to detect the exposure of a vessel or other item to a fuel that may have leaked from elsewhere, as opposed to leaking from the vessel or item itself. Moreover, the vessel or other item can have an exterior surface that is susceptible to fuel. For example, such a "fuel-susceptible" exterior surface may be damaged by exposure to or by direct contact with fuel. Non-limiting examples of such a fuel-susceptible surface may include a surface of an electronic device, a painted surface, and a surface comprising or formed from a material that is degraded or corroded by fuel. It may thus be desirable to use a method described herein to detect whether the fuel-susceptible surface was or is exposed to fuel. Accordingly, such a method can comprise disposing a carbon nanotube coating layer on a fuel-susceptible exterior surface, wherein the carbon nanotube coating layer comprises photoluminescent carbon nanotubes. The method further comprises disposing a fuel-sensitive coating layer over the carbon nanotube coating layer. The fuel-sensitive coating layer is sensitive to the fuel that may be exposed to or placed in direct contact with the fuel-susceptible surface. Additionally, the fuel-sensitive coating layer is optically opaque or substantially opaque to wavelengths of light absorbed and/or emitted by the photoluminescent carbon nanotubes of the carbon nanotube coating layer. Moreover, a method described herein can further comprise exposing the fuel-susceptible exterior surface to a light source for excitation of the photoluminescent carbon nanotubes. Exposing the fuel-susceptible exterior surface to such a light source can indicate whether or not the fuel-susceptible surface has been exposed or placed into direct contact with the fuel, as described above for fuel leaks from fuel-containing vessels. In particular, when a fuel exposure occurs, at least a portion of the fuel-sensitive coating layer can be dissolved, dispersed, removed, thinned, or otherwise altered such that the fuel-sensitive coating layer becomes transparent rather than opaque, particularly with respect to light absorbed and/or emitted by the photoluminescent carbon nanotubes of the underlying carbon nanotube coating layer. In such an instance, the light source can excite the photoluminescent carbon nanotubes, the photoluminescent carbon nanotubes can then emit photoluminescence, and the photoluminescence of the emissive carbon nanotubes can be detected by a photodetector. Thus, in some implementations, a method described herein further comprises detecting photoluminescent emission of the photoluminescent carbon nanotubes after exposing the fuel-susceptible exterior surface to a light source that excites the photoluminescent carbon nanotubes. The detected photoluminescence can thus serve as a positive signal indicating the presence of a fuel exposure, particularly by identifying a region of the fuel-susceptible exterior surface that has been exposed to fuel in a manner sufficient to result in the detection of photoluminescence from the photoluminescent carbon nanotubes disposed on that region. Conversely, a method described herein may comprise exposing the fuel-susceptible exterior surface to a light source for excitation of the photoluminescent carbon nanotubes and subsequently detecting no photoluminescence from the photoluminescent carbon nanotubes of the carbon nanotube coating layer. In such an instance, the absence of detected photoluminescence can serve as a negative signal indicating that no fuel exposure has occurred. It is further to be understood that the various steps and components described above for fuel leak detection from a fuel-containing vessel can be used in an analogous manner for the detection of the exposure to fuel of a fuel-susceptible surface that may be associated with a vessel or other item that does not necessarily contain the fuel.

Methods described hereinabove are directed to detecting a fuel leak. However, it is to be understood that methods described herein may also be used to detect the release of other fluids from a vessel or from another location. Thus, in another aspect, more general methods of detecting a fluid are described herein. In such implementations, a method comprises disposing a carbon nanotube coating layer on an exterior surface of a fluid-containing vessel (or, alternatively, on a fluid-susceptible exterior surface of a vessel or other item that does not necessarily contain fluid, as described above). As in other implementations described herein, the carbon nanotube coating layer comprises photoluminescent carbon nanotubes, and the method further comprises disposing a fluid-sensitive coating layer over the carbon nanotube coating layer. The fluid-sensitive coating layer is sensitive to the fluid contained in the fluid-containing vessel (or, alternatively, to the fluid to which the fluid-susceptible exterior surface may be exposed) in a manner described above for fuel-sensitive coating layers. Additionally, the fluid-sensitive coating layer is optically opaque or substantially opaque to wavelengths of light absorbed and/or emitted by the photoluminescent carbon nanotubes of the carbon nanotube coating layer. Moreover, a method described herein can further comprise exposing the exterior surface of the fluid-containing vessel (or, alternatively, the fluid-susceptible exterior surface) to a light source for excitation of the photoluminescent carbon nanotubes. Exposing the exterior surface of the fluid-containing vessel (or, alternatively, the fluid-susceptible exterior surface) to such a light source can indicate whether or not a fluid leak or other release of the fluid (or alternatively, a fluid exposure) has occurred, as described above for fuel leaks more specifically. In particular, when a fluid leak or release occurs, at least a portion of the fluid-sensitive coating layer can be dissolved, dispersed, removed, thinned, or otherwise altered such that the fluid-sensitive coating layer becomes transparent rather than opaque, particularly with respect to light absorbed and/or emitted by the photoluminescent carbon nanotubes of the underlying carbon nanotube coating layer. In such an instance, the light source can excite the photoluminescent carbon nanotubes, the photoluminescent carbon nanotubes can then emit photoluminescence, and the photoluminescence of the emissive carbon nanotubes can be detected by a photodetector. Thus, in some implementations, a method described herein further comprises detecting photoluminescent emission of the photoluminescent carbon nanotubes after exposing the fluid-containing vessel (or, alternatively, the fluid-susceptible exterior surface) to a light source that excites the photoluminescent carbon nanotubes. The detected photoluminescence can thus serve as a positive signal indicating the presence of a fluid leak or release (or, alternatively, of a fluid exposure), particularly by identifying a region of the exterior surface of the fluid-containing vessel (or, alternatively, a region of the fluid-susceptible exterior surface) that has been exposed to fluid in a manner sufficient to result in the detection of photoluminescence from the photoluminescent carbon nanotubes disposed on that region. Conversely, a method described herein may comprise exposing the exterior surface of the fluid-containing vessel (or, alternatively, the fluid-susceptible exterior surface) to a light source for excitation of the photoluminescent carbon nanotubes and subsequently detecting no photoluminescence from the photoluminescent carbon nanotubes of the carbon nanotube coating layer. In such an instance, the absence of detected photoluminescence can serve as a negative signal indicating that no fluid leak or release (or, alternatively, no fluid exposure) has occurred. It is further to be understood that the various steps and components described above for fuel leak detection can be used in an analogous manner for the detection of the leak or release (or alternatively, exposure) of a fluid other than fuel.

II. Systems for Detecting a Fuel Leak

In another aspect, systems for detecting a fuel leak are described herein. In some implementations, such a system comprises a fuel-containing vessel having an exterior surface, a carbon nanotube coating layer disposed on at least a portion of the exterior surface of the fuel-containing vessel, and a fuel-sensitive coating layer substantially covering the carbon nanotube coating layer. The carbon nanotube coating layer comprises photoluminescent carbon nanotubes. Additionally, the fuel-sensitive coating layer is optically opaque or substantially optically opaque to wavelengths of light absorbed and/or emitted by the photoluminescent carbon nanotubes of the carbon nanotube coating layer. In some cases, the system further comprises a light source that excites the photoluminescent carbon nanotubes and/or a detector that detects photoluminescent emission of the photoluminescent carbon nanotubes.

Turning now to specific components of systems described herein, systems described herein comprise a fuel-containing vessel. Any fuel-containing vessel not inconsistent with the objectives of the present disclosure may be used. In some implementations, the fuel-containing vessel comprises a fuel-containing vessel described hereinabove in Section I. For instance, in some cases, the fuel-containing vessel is a fuel storage tank or a fuel line. Similarly, the fuel-containing vessel can contain any fuel not inconsistent with the objectives of the present disclosure, including a fuel described hereinabove in Section I, such as jet fuel.

Systems described herein also comprise a carbon nanotube coating layer disposed on at least a portion of the exterior surface of the fuel-containing vessel. The carbon nanotube coating layer can have any composition, morphology, or combination thereof not inconsistent with the objectives of the present disclosure. In some cases, the carbon nanotube coating layer has a composition, morphology, and/or other feature described hereinabove in Section I for a carbon nanotube coating layer. For example, in some instances, the carbon nanotube coating layer consists essentially of carbon nanotubes. In other cases, the carbon nanotube coating layer comprises carbon nanotubes disposed in a matrix material. Similarly, a carbon nanotube coating layer can be formed or disposed on a surface of a fuel-containing vessel in any manner described hereinabove in Section I.

In addition, systems described herein further comprise a fuel-sensitive coating layer disposed on or over the carbon nanotube coating layer. The fuel-sensitive coating layer can have any composition, morphology, optical properties, and/or other properties not inconsistent with the objectives of the present disclosure. In some cases, the fuel-sensitive coating layer has a composition, morphology, optical property, other feature, or a combination thereof described hereinabove in Section I for a fuel-sensitive coating layer. For example, in some implementations, the fuel-sensitive coating layer comprises or is formed from a polyurethane and a pigment such as carbon black.

In some cases, a system described herein further comprises a light source that excites the photoluminescent carbon nanotubes and/or a detector that detects photoluminescent emission of the photoluminescent carbon nanotubes. Any light source, detector, or combination thereof not inconsistent with the objectives of the present disclosure may be used. In some implementations, the light source and/or detector comprises a light source and/or detector described hereinabove in Section I.

Systems described hereinabove are directed to systems for detecting a fuel leak from a fuel-containing vessel. As described hereinabove in Section I, however, it is also possible to use a system described herein to detect a fuel leak from a vessel or other item that does not or does not necessarily contain the fuel. In some such implementations, a system comprises a fuel-susceptible exterior surface, a carbon nanotube coating layer disposed on at least a portion of the fuel-susceptible exterior surface, and a fuel-sensitive coating layer substantially covering the carbon nanotube coating layer. The carbon nanotube coating layer comprises photoluminescent carbon nanotubes. Additionally, the fuel-sensitive coating layer is optically opaque or substantially optically opaque to wavelengths of light absorbed and/or emitted by the photoluminescent carbon nanotubes of the carbon nanotube coating layer. In some cases, the system further comprises a light source that excites the photoluminescent carbon nanotubes, a detector that detects photoluminescent emission of the photoluminescent carbon nanotubes, or both. It is further to be understood that the various components described above for fuel leak detection from fuel-containing vessels can be used in an analogous manner for the detection of the exposure to fuel of a fuel-susceptible exterior surface.

Systems described hereinabove are directed to systems for detecting a fuel leak. However, it is to be understood that systems described herein may also be used to detect the release of other fluids from a vessel (or, alternatively, to detect the exposure of an exterior surface to a fluid other than fuel). Thus, in another aspect, more general systems of detecting a fluid are described herein. In some such implementations, a system comprises a fluid-containing vessel having an exterior surface (or, alternatively, a vessel or other item having a fluid-susceptible exterior surface, wherein the vessel or other item does not necessarily contain the fluid to which the exterior surface is susceptible), a carbon nanotube coating layer disposed on at least a portion of the exterior surface, and a fluid-sensitive coating layer substantially covering the carbon nanotube coating layer. The carbon nanotube coating layer comprises photoluminescent carbon nanotubes. Additionally, the fluid-sensitive coating layer is optically opaque or substantially optically opaque to wavelengths of light absorbed and/or emitted by the photoluminescent carbon nanotubes of the carbon nanotube coating layer. In some cases, the system further comprises a light source that excites the photoluminescent carbon nanotubes and/or a detector that detects photoluminescent emission of the photoluminescent carbon nanotubes. It is further to be understood that the various components described above for fuel leak detection can be used in an analogous manner for the detection of the leak or release of a fluid other than fuel.

Various implementations of the disclosure have been described in fulfillment of the various objectives of the disclosure. It should be recognized that these implementations are merely illustrative of the principles of the present disclosure. Numerous modifications and adaptations thereof will be readily apparent to those skilled in the art without departing from the spirit and scope of the disclosure.

The invention claimed is:

1. A system for detecting a fuel leak comprising:
a fuel-containing vessel having an exterior surface;
a carbon nanotube coating layer comprising photoluminescent carbon nanotubes disposed on at least a portion of the exterior surface of the fuel-containing vessel; and
a fuel-sensitive coating layer substantially covering the carbon nanotube coating layer, wherein the fuel-sensitive coating layer is optically opaque or substantially optically opaque to wavelengths of light absorbed and/or emitted by the photoluminescent carbon nanotubes.

2. The system of claim 1 further comprising:
a light source that excites the photoluminescent carbon nanotubes; and
a detector that detects photoluminescent emission of the photoluminescent carbon nanotubes.

3. The system of claim 1, wherein the fuel-containing vessel is a fuel storage tank or a fuel line.

4. The system of claim 1, wherein the fuel comprises jet fuel.

5. The system of claim 1, wherein the carbon nanotube coating layer consists essentially of carbon nanotubes.

6. The system of claim 1, wherein the carbon nanotube coating layer comprises carbon nanotubes disposed in a matrix material.

7. The system of claim 1, wherein the carbon nanotube coating layer comprises 100 carbon nanotubes per $cm^2$ to $1 \times 10^8$ carbon nanotubes per $cm^2$.

8. The system of claim 1, wherein the carbon nanotube coating layer has an average thickness of up to 200 nm.

9. The system of claim 1, wherein the fuel-sensitive coating layer comprises polyurethane.

10. The system of claim 1, wherein the fuel-sensitive coating layer has an average thickness of between 1 and 1000 μm.

11. The system of claim 1, wherein the fuel is jet fuel and wherein the fuel-sensitive coating layer comprises polyurethane and carbon black.

12. The system of claim 2, wherein the light source emits light having an average wavelength of 700 to 1100 nm.

13. A method for detecting a fuel leak comprising:
disposing a carbon nanotube coating layer comprising photoluminescent carbon nanotubes on an exterior surface of a fuel-containing vessel; and
disposing a fuel-sensitive coating layer over the carbon nanotube coating layer, wherein the fuel-sensitive coating layer is optically opaque or substantially opaque to wavelengths of light absorbed and/or emitted by the photoluminescent carbon nanotubes of the carbon nanotube coating layer.

14. The method of claim 13 further comprising:
exposing the exterior surface of the fuel-containing vessel to a light source for excitation of the photoluminescent carbon nanotubes; and
detecting photoluminescent emission of the photoluminescent carbon nanotubes.

15. The method of claim 13, wherein the fuel-containing vessel is a fuel storage tank or a fuel line.

16. The method of claim 13, wherein the carbon nanotube coating layer consists essentially of carbon nanotubes.

17. The method of claim 13, wherein the carbon nanotube coating layer comprises 100 carbon nanotubes per $cm^2$ to $1 \times 10^8$ carbon nanotubes per $cm^2$.

18. The method of claim 13, wherein:
the carbon nanotube coating layer has an average thickness of up to 50 nm, and the fuel-sensitive coating layer has an average thickness of between 10 and 1000 μm.

19. The method of claim 13, wherein the fuel is jet fuel and wherein the fuel-sensitive coating layer comprises polyurethane and carbon black.

20. The method of claim 14, wherein the light source emits light having an average wavelength of 700 to 1100 nm.

* * * * *